Figure 1:
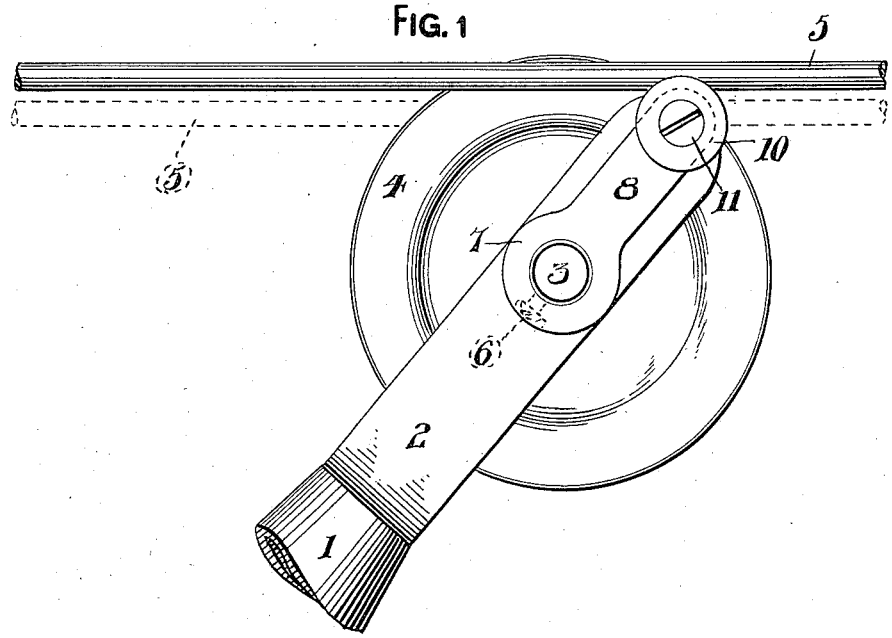

I. KOCIAN.
TROLLEY.
APPLICATION FILED MAR. 22, 1912.

1,027,857.

Patented May 28, 1912.

WITNESSES

INVENTOR
I. Kocian

ATTORNEYS

UNITED STATES PATENT OFFICE.

IZYDOR KOCIAN, OF JUNCTION CITY, ILLINOIS.

TROLLEY.

1,027,857.      Specification of Letters Patent.      Patented May 28, 1912.

Application filed March 22, 1912. Serial No. 685,640.

*To all whom it may concern:*

Be it known that I, IZYDOR KOCIAN, a subject of the Emperor of Austria-Hungary, residing at Junction City, in the county of Marion and State of Illinois, have invented certain new and useful Improvements in Trolleys, of which the following is a specification, reference being had therein to the accompanying drawing.

This invention relates to trolleys, and the primary object of my invention is to furnish a trolley harp with simple and effective means, in a manner as hereinafter set forth for reducing the liability of displacement of a trolley wheel relatively to a trolley wire to a minimum, thereby eliminating the trouble at present experienced by trolley wheels becoming displaced on account of irregularities in a wire, the rapidity of a car when passing around a curved section of track, and the displacement due to various overhead construction.

Another object of this invention is to provide a harp with an attachment that immediately restores the trolley wheel to a wire should the wheel become accidentally displaced, the attachment employed for this purpose maintaining an electrical connection that does not render electric brakes inoperative for the purpose for which they are intended.

A further object of this invention is to accomplish the above results by a mechanical construction that is applicable to various types of trolley harps and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 2:
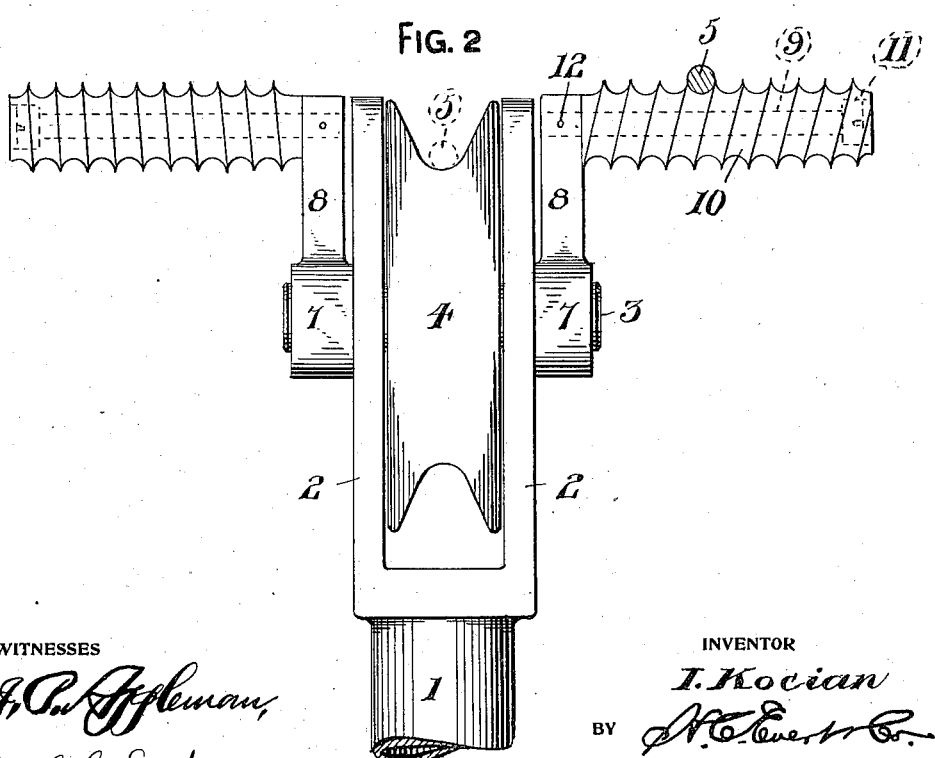

Figure 1 is a side elevation of a trolley in accordance with this invention, and Fig. 2 is a front elevation of the same.

The reference numeral 1 denotes a portion of a trolley pole having a harp 2 provided with an elongated journal pin 3 upon which is revolubly mounted a trolley wheel 4 adapted to travel against a trolley wire 5.

Mounted upon the ends of the journal pin 3 by set screws 6 or other fastening means are the inner barrel-shaped ends 7 of angularly disposed arms 8, said arms being arranged in parallelism with the sides of the harp 2 and extending toward the outer end of the harp. Mounted in the outer ends of the arms 8 are outwardly extending pins 9 and revolubly mounted upon said pins are spirally grooved rollers 10. The rollers are retained upon the pins 9 by the countersunk heads 11 of the pins 9, the pins 9 being countersunk in the outer ends of the rollers. The pins 9 can be in the form of screws that are screwed into the outer ends of the arms 8 and then locked therein by transverse rivets or pins 12. The spiral grooves of the rollers 10 are adapted to return the wire 5 to the trolley wheel 4 should the wire become accidentally displaced, as illustrated in Fig. 1.

What I claim is:—

1. In a trolley, the combination with a trolley harp having a journal pin, of arms having the inner ends thereof mounted upon the ends of said pin, outwardly extending pins carried by the outer ends of said arms, and spirally grooved rollers revolubly mounted upon said pins.

2. In a trolley, the combination with a harp, a journal pin mounted therein, and a wheel revolubly mounted upon said pin within said harp, of arms having the inner ends thereof mounted upon the ends of said journal pin and arranged in parallelism with said harp, outwardly extending pins mounted in the outer ends of said arms, and spirally grooved rollers revolubly mounted upon said pins.

In testimony whereof I affix my signature in the presence of two witnesses.

IZYDOR KOCIAN.

Witnesses:
     J. L. HALEY,
     STANLEY ZYDORCZAK.